United States Patent
Hassel et al.

(10) Patent No.: US 9,446,470 B2
(45) Date of Patent: *Sep. 20, 2016

(54) ENHANCED MAGNETICALLY IMPELLED ARC BUTT WIELDING (MIAB) TECHNOLOGY

(75) Inventors: Thomas Hassel, Hannover (DE); Aret Varahram, Hannover (DE); Detlev Benedict, Niehhagen (DE); Joerg Lehr, Celle Lower Saxony (DE); Friedrich Wilhelm Bach, Isemhagen (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 722 days.

This patent is subject to a terminal disclaimer.

(21) Appl. No.: 13/274,083

(22) Filed: Oct. 14, 2011

(65) Prior Publication Data

US 2013/0092670 A1  Apr. 18, 2013

(51) Int. Cl.
*B23K 9/08* (2006.01)
*B23K 9/028* (2006.01)

(52) U.S. Cl.
CPC ............... *B23K 9/0282* (2013.01); *B23K 9/08* (2013.01)

(58) Field of Classification Search
CPC  B23K 9/0282; B23K 9/0284; B23K 9/0286; B23K 9/08; B23K 9/0737; B23K 2001/12; B23K 2201/10
USPC ....... 219/60 R, 61, 78.16, 123, 125.11, 59.1, 219/60 A; 138/171; 166/85.1
See application file for complete search history.

(56) References Cited

U.S. PATENT DOCUMENTS

| | | | |
|---|---|---|---|
| 3,882,299 A | | 5/1975 | Sciaky |
| 3,937,916 A | | 2/1976 | Sciaky |
| 4,273,986 A | * | 6/1981 | Edson et al. .................. 219/123 |
| 4,278,868 A | * | 7/1981 | Rudd et al. .................... 219/123 |
| 4,421,972 A | * | 12/1983 | Duncan et al. .......... 219/137 PS |
| 4,511,784 A | * | 4/1985 | Miyamori et al. ............ 219/123 |
| 5,117,084 A | | 5/1992 | Kuchuk-Yatsenko et al. |
| 6,211,489 B1 | | 4/2001 | Kuchuk-Yatsenko et al. |
| 7,774,917 B2 | | 8/2010 | Anderson et al. |
| 2004/0265065 A1 | | 12/2004 | Stecher et al. |
| 2007/0108171 A1 | * | 5/2007 | Stecher et al. ................ 219/123 |
| 2010/0212915 A1 | | 8/2010 | Heidecke et al. |

OTHER PUBLICATIONS

PCT/US2012/059029—International Search Report dated Mar. 29, 2013.

* cited by examiner

*Primary Examiner* — Dana Ross
*Assistant Examiner* — James Sims, III
(74) *Attorney, Agent, or Firm* — Mossman, Kumar & Tyler PC

(57) ABSTRACT

A magnetically impelled arc butt (MIAB) welding device heats facing ends of a pair of wellbore tubulars and a force application device compressively engages the facing ends to form a welded joint. The device may be positioned on the rig floor. The MIAB welding device may include a device configured to hold facing ends of the two wellbore tubulars at a specified distance away from one another, a high frequency arc ignition device configured to generate an arc between the facing ends and to revolve the arc around the circumference of the facing ends, and a magnetic field generator configured to superimpose a magnetic field at the facing ends. The MIAB welding device may be configured to melt at least a surface of the facing ends.

14 Claims, 3 Drawing Sheets

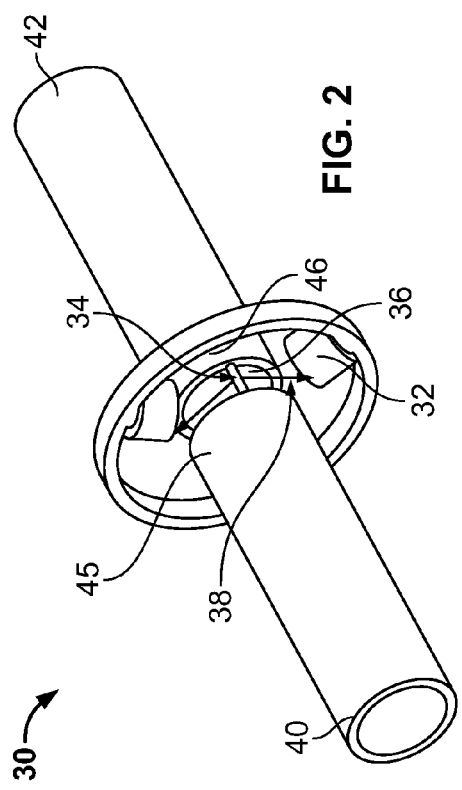
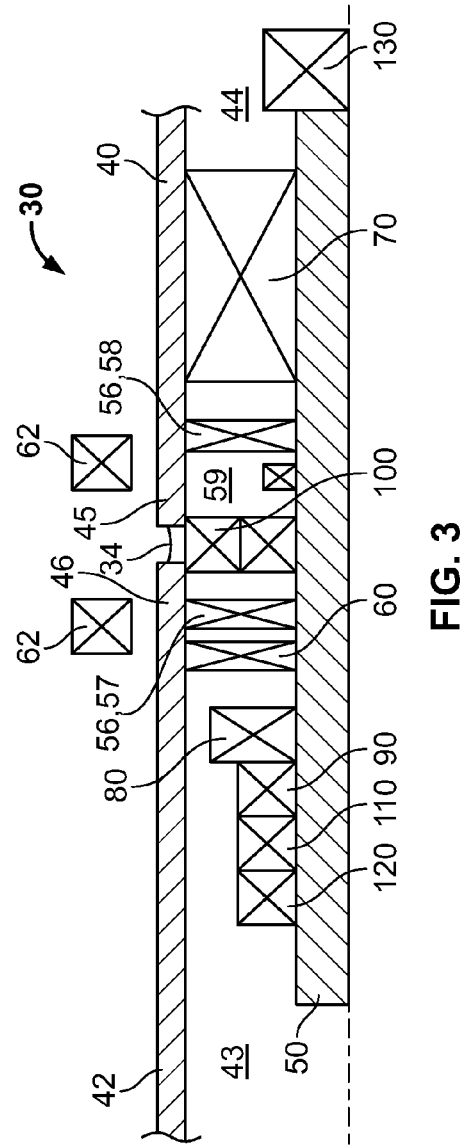

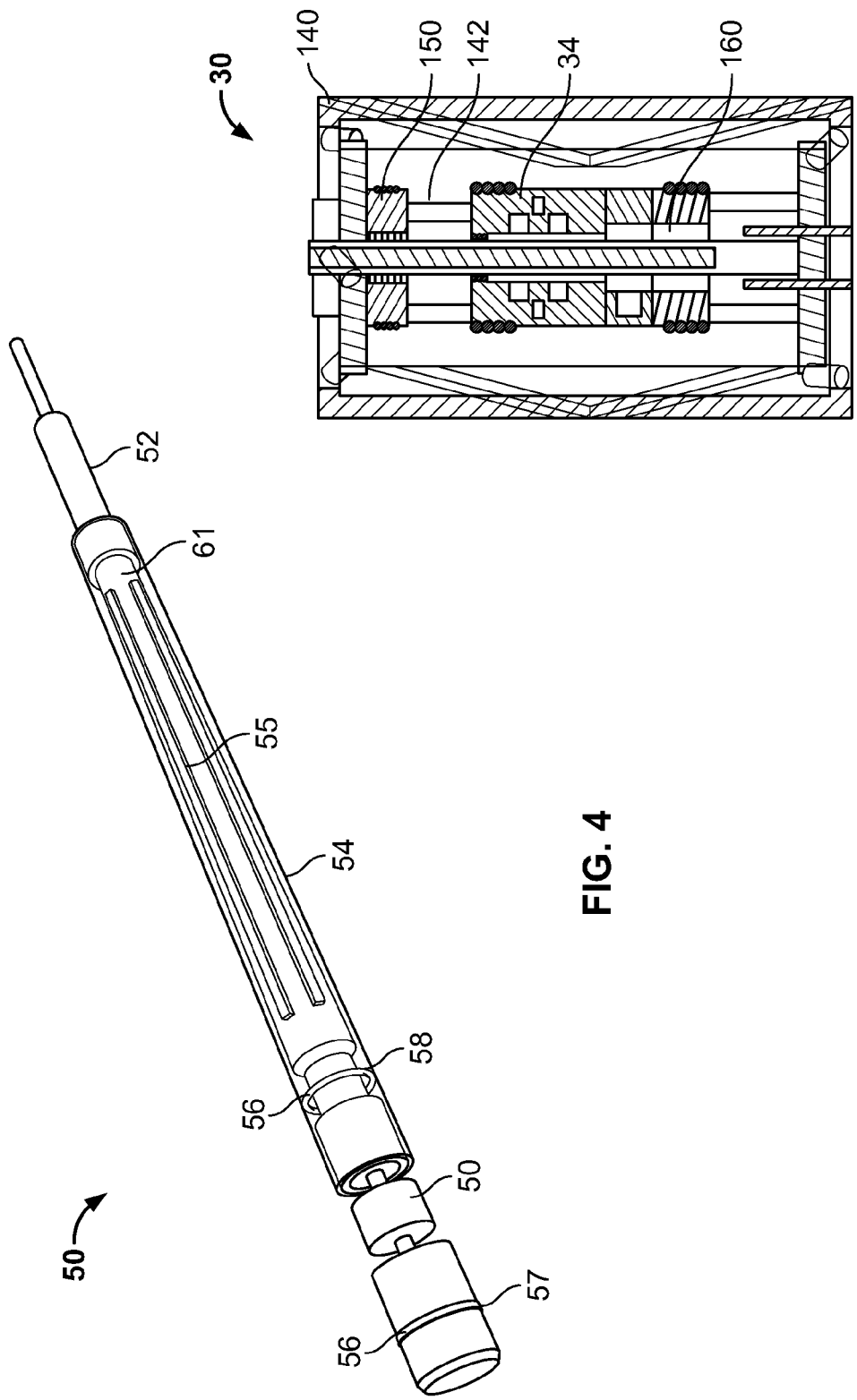

ENHANCED MAGNETICALLY IMPELLED ARC BUTT WIELDING (MIAB) TECHNOLOGY

BACKGROUND OF THE DISCLOSURE

1. Field of the Disclosure

This disclosure relates generally to an apparatus and method for connecting tubulars using a magnetically impelled butt welding device.

2. Description of the Related Art

A variety of tubulars may be used to drill, complete, and produce from an oil field well. During drilling, jointed drill pipe, coiled tubing, liners, or casing may be used as a drill string. During completion, liners, casing, and production tubing may be used to support a drilled wellbore, provide zonal isolation, and convey production fluids to the surface. Typically, jointed tubulars are connected at the rig floor by threaded connections. Personnel on the rig floor ensure the threads are properly aligned. Then, machinery is used to complete the connection. The process is time consuming and requires personnel to be exposed to hazards on the rig floor and the environment.

The present disclosure provides a device and related methods for joining wellbore tubular. The present disclosure, however, may also be applied to tubulars used in other industries. Moreover, while oil field tubulars are generally circular, the present disclosure may also be used to joint tubular having non-round shapes.

SUMMARY OF THE DISCLOSURE

The present disclosure provides devices and methods for connecting tubulars using a magnetically impelled arc butt (MIAB) welding device.

In one aspect, the device may be positioned on the rig floor to join wellbore tubulars. An illustrative device may include a magnetically impelled arc butt (MIAB) welding device that heats facing ends of a pair of wellbore tubulars and a force application device that compressively engages the facing ends to form a welded joint. In some embodiments, the MIAB welding device may include a device that holds facing ends of the two wellbore tubulars at a specified distance away from one another, a high frequency arc ignition device that generates an arc between the facing ends and a magnetic field generator revolves the arc around the circumference of the facing ends. The MIAB welding device may melt at least a surface of the facing ends.

An illustrative method may include heating facing ends of a pair of tubulars using a magnetically impelled arc butt (MIAB) welding device that includes a high frequency arc ignition device and compressively engaging the facing ends using a force application device.

Another illustrative method may include heating facing ends of a pair of wellbore tubulars using a magnetically impelled arc butt (MIAB) welding device, compressively engaging the facing ends using a force application device, conveying the welded wellbore tubulars into a wellbore.

Examples of certain features of the disclosure have been summarized (albeit rather broadly) in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the disclosure, taken in conjunction with the accompanying drawings, in which like elements have been given like numerals and wherein:

FIG. 2 schematically illustrates the operation of a magnetically impelled arc welding system;

FIG. 3 illustrates a magnetically impelled arc welding system made in accordance with one embodiment of the present disclosure;

FIG. 4 illustrates a feed device made in accordance with one embodiment of the present disclosure; and FIG. 5 illustrates another view of a magnetically impelled arc welding system made in accordance with one embodiment of the present disclosure.

DETAILED DESCRIPTION OF THE DISCLOSURE

Figure 1:
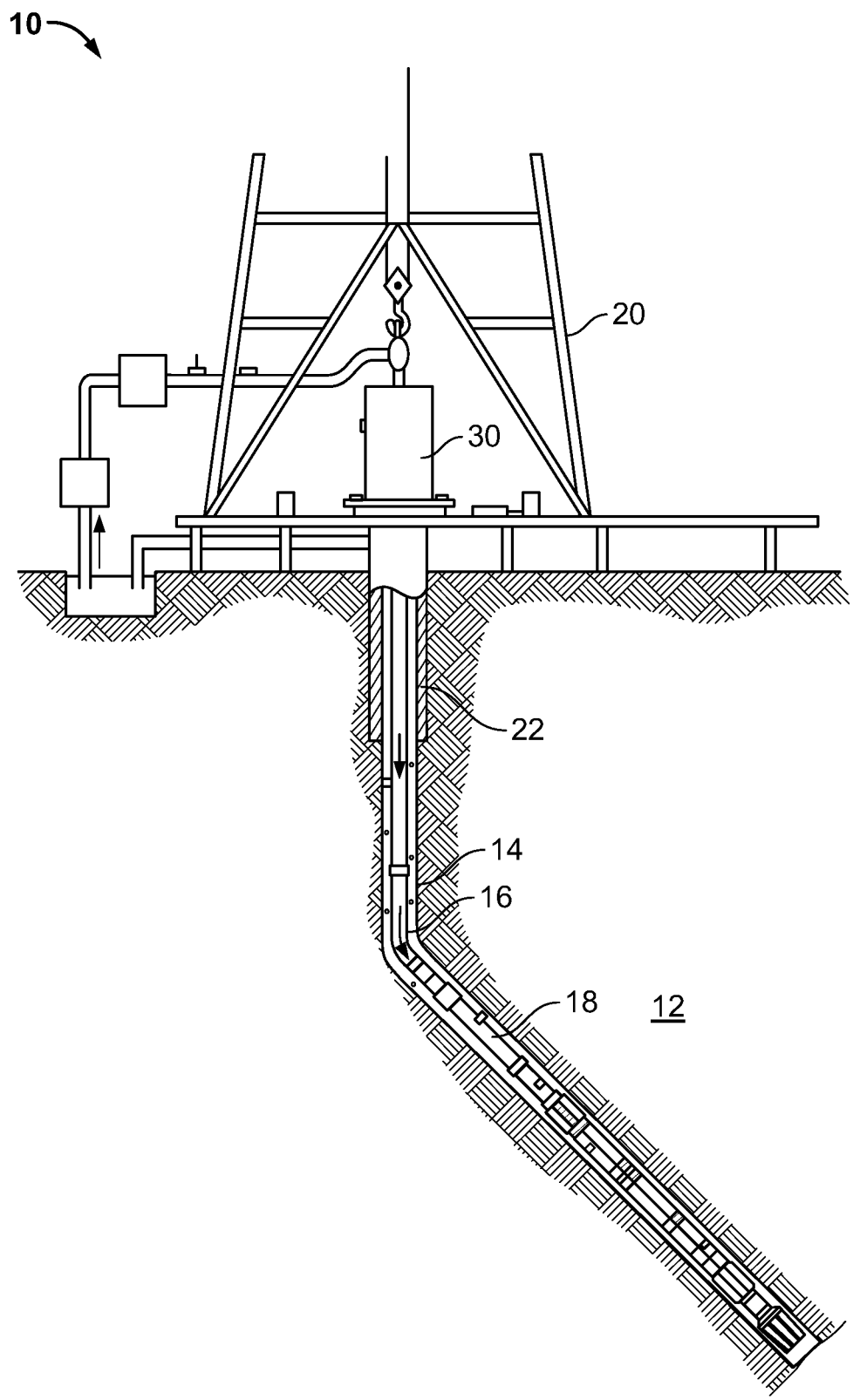
FIG. 1 illustrates a rig having a welding system made in accordance with one embodiment of the present disclosure.

As will be appreciated from the discussion below, aspects of the present disclosure provide an apparatus and method for making a welded connection between tubulars using a magnetically impelled arc butt (MIAB) welding device. In one aspect, the MIAB welding device may be configured to heat facing ends of a pair of tubulars using a high frequency arc ignition device or a drawn arc and to compressively engage the facing ends using a force application device. The tubulars may be round or non-round, and may be adapted for any type of use (e.g., underground, above-ground, conveying fluids, enclosing cables or wires, etc.). In another aspect, the MIAB welding device may be configured to melt facing ends of a pair of wellbore tubulars and to use a force application device to compressively engage the facing ends to form a welded joint. The wellbore tubular may be rigid drill pipe, coiled tubing, casing, production tubing, or liners. Merely for brevity, embodiments of the present disclosure will be discussed in the context of an oil rig.

Referring now to FIG. 1, there is shown one illustrative embodiment of a platform 10 for drilling a wellbore 14 in an earth formation 12. While a land-based rig is shown, these concepts and the methods are equally applicable to offshore rigs. The platform 10 may include a drill string 16 that is suspended from a rig 20. The drill string 16, which may be formed of tubular joints or segments 18, may include power and/or data conductors such as wires for providing bidirectional communication and power transmission. The wellbore 14 may be lined with tubulars such as casing 22 or liners. The platform 10 may also be used to perform other well-related activities; e.g., completion activities such as lining and cementing a well and installing production tubing.

The drilling system 10 may include a magnetically impelled arc butt welding (MIAB) device 30 to form the drill string 16, or other wellbore structure, by welding successive joints of wellbore tubulars at the rig floor. Magnetically Impelled Arc Butt (MIAB) welding involves heating two components with an arc that is moved around the components' circumferences by a magnetic field. Once the ends of the components are sufficiently heated so as to plastically deform, the two ends are pressed together. The weld formed by this process is not a typical weld structure (e.g., a base material (BM) of a first pipe/a heat affected zone (HAZ) of a first pipe/a weld zone (WZ)/a heat affected zone of a second pipe/a base material of a second pipe). Rather, because of the press process, the weld zone (WZ) is pressed radially outwards and is not a part of the bond zone. Therefore, the resulting weld structure may be: a base metal (BM) of a first pipe/a heat affected zone (HAZ) of a first pipe/a heat affected zone (HAZ) of a second pipe/and a base metal (BM) of a second pipe. Filler material is not required in this process.

Referring now to FIG. 2, there are generally shown portions of an MIAB welding device 30 that control the arc during the welding process. For clarity, the drawing should be viewed as the right side being the top and the left side being the bottom, although the disclosure allows for configurations having other relative alignments or orientations. The welding device 30 may include a magnetic field generator 32 arrayed around tubulars 40, 42 that have ends 45, 46, respectively. The magnetic field generator 32 is configured to cause an arc 34 in the gap 36 between the ends 45, 46 to rotate along a circumferential weld path. The magnetic field generator 32 generates a magnetic field that interacts with the arc 34 to generate an electromagnetic force 38 (or Lorentz force). The electromagnetic force 38 is influenced by the magnetic flux density in the gap 36, the arc current and the arc length (i.e., gap size). The magnetic field generator 32 may include a naturally magnetic material, an engineered magnetic material, a permanent magnet, an electromagnet, or a combination thereof. The term "magnet" is used herein to refer to any element, object, device that generates a magnetic field.

In embodiments, the welding device 30 may be configured to use high frequency (HF) ignition arc. The arc guiding system 60 has one or more independent power source unit that may be configured to generate the HF ignition arc. HF consists of high voltage sparks of several thousand volts which last for a few microseconds. The HF sparks will cause the tubular ends and gap to break down or ionize. Once an electron/ion cloud is formed, current can flow from the power source. In other embodiments, a drawn arc may be used.

Referring now to FIG. 3, there is schematically shown one embodiment of a MIAB welding system 30 that may be used to join the wellbore tubulars 40, 42. The welding system 30 may include components, devices and systems that enable handling and positioning, or 'handling devices,' enable the welding process, or 'welding devices,' enable the pre-treatment or post-treatment of the tubulars, 'treatment devices,' and/or enable the analysis of the tubular, or 'analysis devices.' The components act either in sequence or cooperatively to feed and position the tubulars 40, 42 in the system 30, weld the tubulars 40, 42, and perform any necessary finishing operations for the welded tubulars 40, 42.

In one embodiment, the system 30 may include a feeding device 50, an arc guiding system 60, a gas insertion system 70, a machining system 80, a heating system 90, a forming device 100, an inspection system 110, a coating system 120, and an adaptive system 130. It should be understood that FIG. 3 depicts all of the described systems merely for ease of explanation. Other embodiments of the present disclosure may omit some, if not most, of the described systems (e.g., welding re-forming, testing, etc.).

Referring now to FIGS. 3 and 4, there is shown one embodiment of a feeding device 50 that may be used to manipulate and secure wellbore tubulars 40, 42. The feeding device 50 may include a mandrel 52 that actuates a gripper 54 and a sealing assembly 56. The gripper 54 and the sealing assembly 56 may be positioned on a support shaft 61. The arc guiding system 60 may be nested within the sealing assembly 56.

Referring to FIG. 4, the gripper 54 may include one or more radially extendable pads 55 that extend outward to engage a surface of an inner bore of the upper tubular 40. The pads 55 may be actuated hydraulically, electrically, or by any other suitable method. The pads 55 may be configured as circumferentially arrayed fingers or slips, an annular inflatable packer, or any other arrangement adapted to engage and secure the upper tubular 40.

Referring now to FIGS. 3 and 4, the sealing assembly 56 may include a lower bore seal 57 and an upper bore seal 58. The lower bore seal 57 engages and seals off the bore 43 of the lower tubular 42. The upper bore seal 58 engages and seals of the bore 44 of the upper tubular 40. Thus, the seals 57, 58 cooperate to form an isolated zone 59 at the arc guiding system 60. That is, the isolated zone 59 is isolated from fluid flow up from the wellbore via the bore 43 or ambient fluids flowing down through the bore 44. In one embodiment, the seals 57, 58 may be inflatable seals that form a gas-tight seal.

Referring now to FIG. 3, the arc guiding system 60 guides the arc between the welding surfaces of the tubulars 40, 42 in a manner that allows a homogeneous heating and/or melting. The arc guiding system 60 may include solenoids 62 to create electromagnets can increase the force of the magnet fields. Thus, the welding arc 34 can rotate around the circumference of the tubulars 40, 42 at a higher rate, thus decreasing welding time for large diameter tubulars. The arc guiding system 60 may also include circuitry to oscillate the arc 34 radially using a superimposed magnetic field during revolution and to change the radial position of the arc 34 between revolutions. The arc guiding system 60 may also be configured to adjust the magnetic field orientation to cause the desired arc position and/or movement.

The gas insertion system 70 may be used to flow an inert gas into the isolated area 59 to reduce the likelihood of explosive gases from being present during the welding process and to prevent oxidation of surfaces during welding. The gas insertion system 70 may flow a shielding gas into the isolated zone 59 to reduce or eliminate hazardous materials (e.g., combustible gases) in the vicinity of the tubular ends 45, 46 that are being welded. Suitable shielding gas may include helium, argon, an engineered combination of gases, or any other inert or semi-inert gas that will protect the welding area from the surrounding environment. The shielding gas may be pumped by a suitable line (not shown), via the bore of the tubulars 40, 42, and/or from a location external to the tubulars 40, 42.

The machining system 80 may prepare the weld surfaces, rework the isolated area and/or the weld seam area 59 after welding, collect cuttings and other debris generated by the machining system 80, and structure or form the inner surfaces of the tubulars 40, 42. The machining system 80 may use known features such as cutters and abrasive surfaces to re-form the weld. Additionally, devices such as electromagnet catchers and aspirators may be used to capture and collect the debris and cuttings.

The heating system 90 may be used to heat treat the welded tubulars (e.g., at the weld seam), if needed, to obtain one or more desired material properties. The heating system 90 may use known heating devices (e.g., induction techniques) to increase or decrease strength or hardness, remove residual stresses, refine grain size or change the electromagnetic properties.

The forming device 100 may include a ceramic protective covering device that provides a constant diameter of the tubular, or drift diameter, during the welding process. The forming device 100 many include one or more surfaces that shape a weld during the welding process.

The inspection system 110 may be used to perform one or more inspections of the weld and the tubulars 40, 42. For example, the inspection system 110 may test the material property or properties of the weld and the area around the weld. Also, the inspection system 110 may perform geometrical measurements of the weld and surrounding area. For example, the inspection system 110 may measure drift diameter, weld size, the presence of discontinuities, etc. The inspection system 110 may use known inspection techniques such as optical, ultrasonic, calipers, etc.

The coating system 120 may apply or regenerate one or more coatings in the weld seam area and/or the inner surfaces defining the bores 44, 43 of the wellbore tubulars 40, 42. The coating system 120 may include spray nozzles or foil application devices.

The adaptive system 130 may be a connector that is configured to connect with common drilling rig lifting and handing equipment or automated lifting and docking stations (ALDS). The adaptive system 130 may be shaped to receive a crane hook, hydraulic connectors, pneumatic connectors, electric connectors or other similar devices that allow the ALDS or personnel to secure and move the feed device 50. The adaptive system 130 may include suitable connections (not shown) for receiving pressurized air and power. The welding system 30 may include an arc electrical power supply for generating an arc and process control circuitry for controlling the welding process. These components are known in the art and will not be discussed in further detail.

Referring now to FIG. 5, there is shown the welding system 30 positioned in a housing or frame 140 that is constructed for use on a drill rig 20 (FIG. 1). The frame 140 may be portable and configured for installation and removal from a drill rig. The welding system 30 may include a feed device 50 as described previously that can manipulate and secure the tubular components in place within a process chamber 142 during the welding process. The welding may be performed by the arc guiding system 60 and other devices previously described. Additionally, the welding system 30 includes a force applicator 150 that can drive the upper tubular 40 (FIG. 3) against the lower tubular 42 (FIG. 1 3). The lower tubular 42 may be held stationary relative to the frame 140 with a suitable clamping device 160. The device used to apply the axial force can be either automatic or manual and may include pneumatic, electrical, and/or hydraulic devices.

Referring now to FIGS. 1-5, in one mode of operation, the adaptive system 130 may be used to connect the feed device 50 to any available rig moving and handling equipment. Then, the feed device 50 may be inserted into the upper tubular 40 and the gripping system 54 may be activated to engage and capture the upper tubular 40. Next, the upper tubular 40 is fed into and positioned within the process chamber 142 of the welding system 30. The tubular ends 45, 46 may initially be positioned in contact with one another or separated by a gap of a few millimeters. Also, the sealing assembly 56 may be activated to seal off the bores 44, 45 and form the isolated zone 59.

Welding begins by flowing an inert gas into the isolated zone 59 and by activating a power source to flow electricity through the ends 45, 46. The ends 45, 46 may be separated, if in contact, to generate a high frequency arc, such as arc 34, in the gap between the tubular ends 45, 46. The welding arc 34 heats the edges of the ends 45, 46. Simultaneously, the arc 34 rotates around the circumference of the tubulars 40, 42 due to the electro-magnetic force created between the magnet(s) 32 and the arc 34. In some embodiments, the surfaces of the ends 45, 46 are heated, but the surfaces of the tubular do not melt. In other embodiments, the surfaces of the ends 45, 46 are heated until the surface melt. This may be different from conventional forging methods wherein the material does not melt during the welding process. Also, during the welding process, the arc 34 may oscillate radially between the inner and outer diameters of the tubulars 40, 42. Once the ends 45, 46 of the tubulars 40, 42 are sufficiently heated so as to plastically deform, the force applicator 150 applies an axial force to the upper tubular 40 to compressively engage the heated end 44 with the heated end 46. During this process, the forming device 100 may maintain a constant diameter of the tubular.

After welding, the machining system 80, the heating system 90, the inspection system 110, and the coating system 120 may be activated as used as needed to form a welded joint having the desired geometrical and material properties. Of course, one or more of these systems may be used prior to welding as well.

As noted previously, rigid drill pipes are only one non-limiting type of wellbore tubular that may be welded using the present teachings. Other illustrative wellbore tubulars, include, but are not limited to, coiled tubing, and tubulars that are used to strengthen or isolate zones in a well (e.g., casing or liners). Still other tubulars that may be welded using the present teachings may be unrelated to the oil and gas production, e.g., underground or even above-ground pipes for conveying fluids (e.g., gas, water, oil, etc.) or for protecting wires, cables, and the like. Another new feature is that the tubular components can also be contoured i.e. having a non-round (and not just oval).

While the foregoing disclosure is directed to the one mode embodiments of the disclosure, various modifications will be apparent to those skilled in the art. It is intended that all variations within the scope of the appended claims be embraced by the foregoing disclosure.

What is claimed is:

1. An apparatus for connecting wellbore tubulars at a rig floor, comprising:
    a magnetically impelled arc butt (MIAB) welding device positioned on the rig floor, the MIAB welding device including:
        (i) a high frequency arc ignition device having a power unit generating an arc between facing ends of two wellbore tubulars, wherein the high frequency arc ignition device generates sparks on the order of thousands of volts that last on the order of microseconds,
        (ii) a magnetic field generator disposed around the facing ends and superimposing a magnetic field at the facing ends, the magnetic field generator having at least one magnet interacting with the arc, and
        (iii) process control circuitry programmed to control welding of the facing ends, and
    a force applicator compressively engaging the facing ends to form a welded joint; and
    a feeding device holding the facing ends of the two wellbore tubulars at a specified distance away from one another, the feeding device including a mandrel and a gripper engaging at least one of the two wellbore tubulars.

2. The apparatus of claim 1, wherein the MIAB welding device is configured to melt at least a surface of the facing ends.

3. The apparatus of claim 1, further comprising a solenoid power source configured to increase the rotational speed of the arc.

4. The apparatus of claim 1, wherein the wellbore tubulars are selected from one of: (i) a casing, (ii) a liner, (iii) a rigid tubular, and (iv) a non-rigid tubular.

5. The apparatus of claim 1, wherein the tubulars have a non-circular shape.

6. The apparatus of claim 1, further comprising a handling device configured to convey the welded wellbore tubulars into a wellbore.

7. The apparatus of claim 1, wherein the magnetic field generator includes at least one of: (i) a naturally magnetic material, (ii) an engineered magnet, (iii) a permanent magnet, and (iv) an electromagnet.

8. The apparatus of claim 1 further comprising a sealing device having a first bore seal and a second bore seal, each bore seal sealing a bore of an associated wellbore tubular, the first bore seal isolating the facing end of the associated wellbore tubular from a borehole fluid, the second bore seal isolating the facing end of the associated wellbore tubular from an atmosphere at the associated wellbore tubular.

9. The apparatus of claim 1 further comprising a frame positioned at the rig floor, the frame having a process chamber, wherein the MIAB welding device welds the facing ends in the process chamber.

10. A method for connecting tubulars, comprising:
    positioning a magnetically impelled arc butt (MIAB) welding device on a rig floor, the MIAB welding device including (i) a high frequency arc ignition device having a power unit generating an arc between facing ends of two tubulars, wherein the high frequency arc ignition device generates sparks on the order of thousands of volts that last on the order of microseconds, (ii) a magnetic field generator disposed around the facing ends and superimposing a magnetic field at the facing ends, the magnetic field generator having at least one magnet interacting with the arc, and (iii) process control circuitry programmed to control welding of the facing ends;
    holding the facing ends of the two wellbore tubulars at a specified distance away from one another using a feeding device, the feeding device including a mandrel and a gripper engaging at least one of the two wellbore tubulars;
    heating facing ends of the two wellbore tubulars using the MIAB welding device; and
    compressively engaging the facing ends using a force application device.

11. The method of claim 10, wherein the heating melts at least a surface of the facing ends.

12. The method of claim 10, further comprising at least periodically changing a radial position of the arc.

13. The method of claim 10, further comprising oscillating a radial position of the arc.

14. The method of claim 10, wherein the magnetic field is generated by using a solenoid.

* * * * *